United States Patent [19]

Lindhuber et al.

[11] Patent Number: 5,024,488
[45] Date of Patent: Jun. 18, 1991

[54] HUB COVER ASSEMBLY

[75] Inventors: Thomas C. Lindhuber, Montgomery, Ala.; Edward N. Campbell, Oklahoma City, Okla.

[73] Assignee: Dana Corporation, Toledo, Ohio

[21] Appl. No.: 501,686

[22] Filed: Mar. 29, 1990

[51] Int. Cl.[5] .............................................. B60B 7/00
[52] U.S. Cl. ........................ 301/108 S; 301/108 TW; 411/999
[58] Field of Search ........... 301/108 R, 108 A, 108 S, 301/108 TW; 411/107, 533, 970, 999

[56] References Cited

U.S. PATENT DOCUMENTS

| | | | |
|---|---|---|---|
| 1,954,757 | 4/1934 | Maranville | 301/108 R X |
| 3,331,638 | 7/1967 | Fruth | 301/108 TW |
| 4,768,259 | 9/1988 | Rock et al. | 411/999 X |

Primary Examiner—Russell D. Stormer
Attorney, Agent, or Firm—F. B. McDonald

[57] ABSTRACT

A sub-assembly consisting of a synthetic plastic hub cover, separate fastener members, and a gasket improves efficiency in the production line mounting of hub covers to vehicular wheel ends. In a preferred form, each sub-assembly incorporates a plurality of fasteners (i.e. mounting bolts), lock washers, and a gasket, all secured to a moldable cover. The cover includes a plurality of cylindrical mounting apertures, each aperture containing an integrally molded segmented, tapered flange of a predetermined thickness. In a preferred embodiment the segments are designed to elastically flex upon insertion of a fastener through the aperture for retaining the fastener within the aperture. The gasket is retained against the cover via shafts of the bolts.

7 Claims, 1 Drawing Sheet

HUB COVER ASSEMBLY

BACKGROUND OF THE INVENTION

This invention relates to hub covers for non-driving, oil retaining, vehicular wheel ends of the type utilized on highway trucks, particularly semi tractor trailers. More particularly, the invention relates to apparatus for mounting such covers to the wheel ends.

A number of devices are utilized to insure continuity and reliability of wheel end lubrication. One is a hub cover designed to retain oil, which includes a translucent window for direct observation of oil level. Although many such covers have been made of steel or aluminum stampings which necessitate use of a separate material for the window, the use of a one-piece translucent plastic cover has gained appeal in recent years for cost control.

Notwithstanding improvements in design of such covers in the past few years, several areas remain viable for improvement. For example, it is still necessary to install lock washers, mounting bolts, and gaskets at the point of wheel end assembly. It would be considerably more convenient if assembly of such separate pieces could be avoided during production line mounting of the covers.

SUMMARY OF THE INVENTION

The hub cover assembly of the present invention provides a pre-assembled module consisting of a cover, lock washers, mounting bolts, and a gasket. As such, a complete hub cover assembly can be applied to a machined wheel mounting surface in a singular effort for enhancing production line efficiency.

In a preferred form, the present hub cover assembly includes a molded cover having a peripheral flange containing a number of spaced mounting apertures. Each of the apertures is cylindrical and includes a relatively thin, flexible, segmented annular flange defining an axial boundary of the aperture. Individual segments of the flange extend radially inwardly from the aperture walls. Extending from the cylindrical aperture wall, the segments are slightly tapered along their widths, thus defining a plurality of V-shaped spaces between adjoining segments, the bottoms of the V's being spaced about the aperture wall. Upon insertion of a fastener into the aperture, the segments are deflected axially in the aperture via displacement by the fastener. The thickness of the segments is such as to effectively frictionally retain the fastener in the aperture from the time of manufacture of the cover until installation of the cover to a wheel end. The thickness is preferably not so great as to require forces sufficient to create plastic deformation of the flange upon insertion of a fastener.

In the preferred embodiment, the thickness of the segments is also tapered. The segments, cantelevered from the aperture wall, have their greatest thickness at the aperture wall.

DETAILED DESCRIPTION OF A PREFERRED EMBODIMENT

Figure 1:
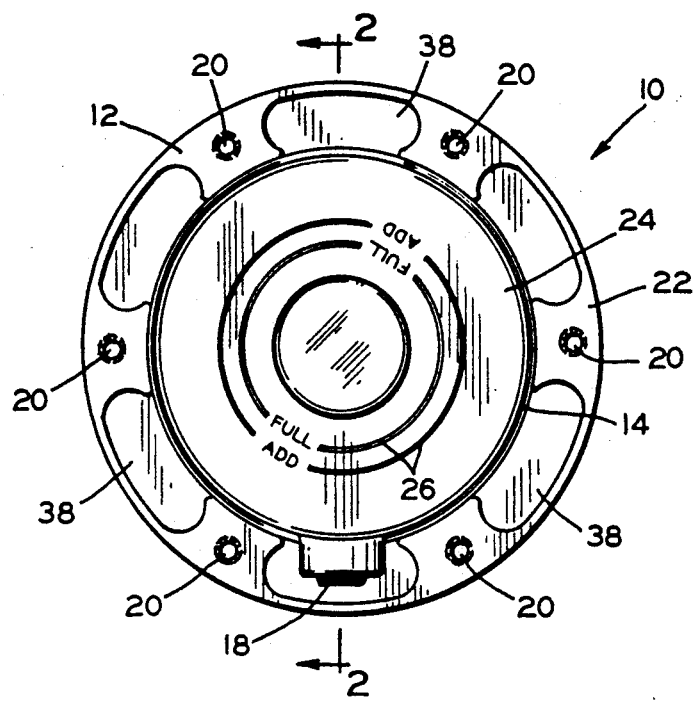
FIG. 1 is an elevational face view of a hub cover which incorporates a preferred embodiment of the present invention.
Figure 2:
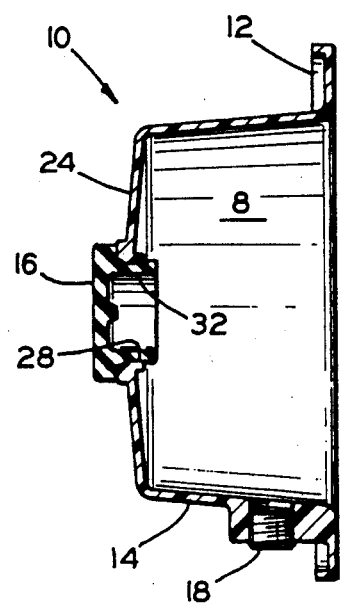
FIG. 2 is a cross-sectional view along lines 2—2 of FIG. 1.

Referring initially to FIGS. 1 and 2, a hub cover 10 is formed of a moldable, translucent material, such as a polycarbonate or nylon plastic. The latter are representative of synthetic plastics which generally have greater impact, oil, and heat resistance (250°-300° F. degrees) than do non-synthetic plastics. The hub cover 10 includes a peripheral hub portion 12 containing a plurality of spaced cylindrical mounting apertures 20.

A hub body portion 14 forms the central core of the cover 10, the portion 14 acting as an oil cavity 8 for a wheel end assembly (not shown) to which the cover is adapted to be mounted. The body portion 14 accommodates a synthetic rubber oil plug 116 for field service and scheduled maintenance, and a separate factory steel plug 18 for accommodating an initial pre-measured charge of oil from a pressurized source during production line mounting of the cover to a wheel end.

The translucency of the cover material provides a window portion 24 through which the oil level in the cover 10 remains visible at all times. For this purpose, a pair of radially concentric oil level lines 26 provide a convenient reference by which the level may be periodically checked. An annular flange 32, as an integral part of the field service plug 16, extends axially into the cavity 8 and engages an interior annulus 28 of the window portion 24 to insure against leakage of oil from the cavity.

Figure 3:
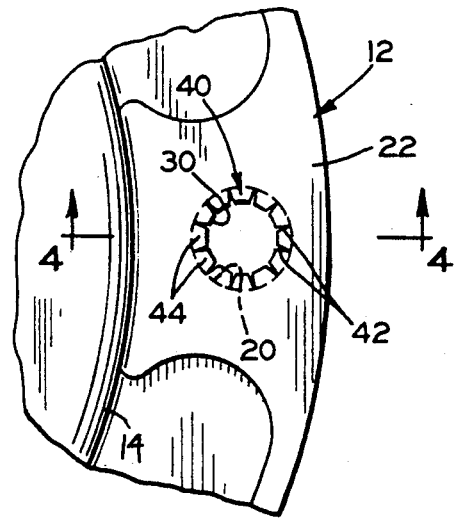
FIG. 3 is a fragmentary face view of one of the apertures of the present invention, showing a plurality of pie-shaped radially extending segments within the aperture prior to installation of a fastener through the aperture.
Figure 4:
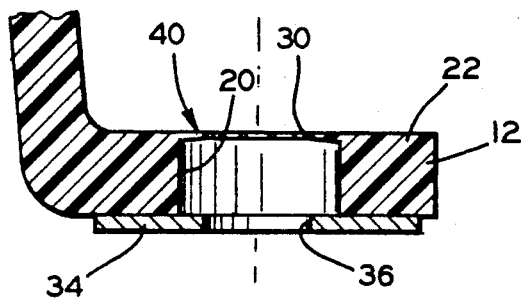
FIG. 4 is a cross-sectional view of the aperture of FIG. 3, as viewed along lines 4—4, including a fragmentary view of a gasket adapted for assembly to the cover prior to insertion of a fastener.

Referring to FIGS. 1, 3, and 4, each of the apertures 20 is contained in an embossed aperture fillet 22 positioned on the hub portion 12. Each aperture fillet 22 has a thickness greater than that of the nominal hub cover thickness, including the web areas 38 between fillets, and in the preferred embodiment herein contains only one aperture 20. Referring specifically to FIG. 3, each aperture 20 incorporates an integrally molded annular flange 40 having a plurality of pie-shaped segments 44 which define a V-shaped space 42 between each segment. Each flange 40 defines an upper axial boundary (see FIG. 4) of its associated cylindrical aperture 20. The preferred flange 40 is formed of a relatively thinner, hence more flexible, portion of the translucent plastic material of which the hub cover is molded.

Figure 5:
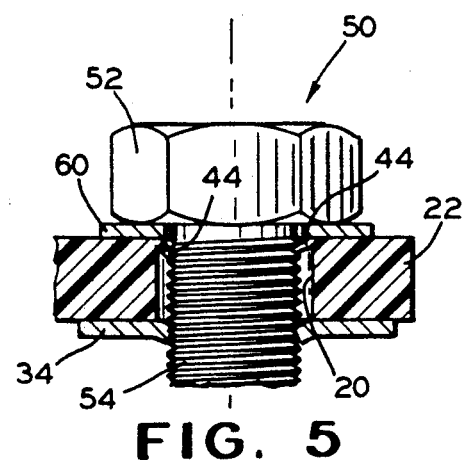
FIG. 5 is a cross-sectional view of the aperture of FIG. 4, after installation of a threaded fastener through a lock washer, cover, and gasket.

Referring now also to FIG. 5, those skilled in the art will appreciate that a conventional threaded fastener, such as the mounting bolt 50 shown, has a head 52 and a shaft 54. Upon insertion of the shaft 54 through a lead-in hole 30 (FIG. 3) defined by the radially extending concentrically aligned ends of the segments 44 of the flange 40, the segments will deflect axially and engage the sides of the shaft 54 as shown. The segments are flexibly resilient, yet must apply enough of a friction force against the shaft 54 to enable retention of the fastener 50. The lead-in hole 30, formed by the segments 44 which are cantilevered from the wall of the aperture 20, enlarges to enable the threads of the shaft 54 to pass into and through the aperture 20. In a preferred form, the hole 30 has an initial diameter approximately equal to the root diameter of the shaft thread, so that the ends of the segments can snap back to initial position and ultimately extend into the shaft root (between the shaft threads) for optimal retention of the bolt 50.

Referring now specifically to FIG. 4, a gasket 34 also forms a part of the presently preferred hub cover assembly, and apertures 36 of the gasket 34 have diameters smaller than the diameters of the shafts 54 to provide frictional retention of the gasket to the bolt shafts. As the gasket is not of a moldable material, no special flange is required in apertures 36 as required in the apertures 20 of the plastic hub cover 10.

In the present embodiment, and by way of example, the hub cover 10 has a nominal thickness of 150 thousandths of an inch. The fillets 22 are three-sixteenths of an inch, and the nominal webb area 38 (between fillets) is 70-80 thousandths of an inch. The cylindrical aperture 20 is sized to accommodate a five-sixteenths inch bolt 50. The V-shaped spaces 42 between the segments 44 measure approximately 15-25 thousandths at the ends 30, tapering down to zero at the base (the aperture wall) of the segments. The lead hole 30 is 260 thousandths in diameter, approximately equal to root diameter of the bolt.

Those skilled in the art will appreciate that the integrally molded flange 40 should be of a thickness such that the insertion of a fastener 50 will cause the segment to elastically deflect, but not break away from the aperture 20 during insertion and subsequent retention of the fastener shaft 54. The thickness of the segments 44 range from 8-12 thousandths at their base (aperture wall) to 4-6 thousandths at their ends (hole 30). It will also be appreciated by those skilled in the art that the thickness of the fillet 22 (FIG. 5) should be such that the segments 44 will not create interference with either the gasket or a machined wheel mounting surface.

A preferred method of making the hub cover assembly of the present invention includes the steps of:

(a) providing a hub cover formed of a moldable material, said cover including a peripheral hub portion, a plurality of hub mounting apertures in the peripheral hub portion, an annular flange comprising radially extending segments molded integrally in at least one aperture, the annular flange having a predetermined thickness sized for flexibility, (b) installing a fastener shaft through the annular flange so as to axially and elastically deflect the segments to retain the fastener, and (c) applying a gasket adapted and sized for mating with the cover, the gasket having at least one aperture sized to form an interference fit with the shaft of the fastener.

Finally, the presently preferred embodiment also incorporates a lock washer 60, installed just prior to insertion of the fastener 50 through the aperture 20. The washer is preferably of the "star" type to minimize any tendency of the fastener shaft to cock away from center, although a "split" type of lock washer may be satisfactorily used.

Those skilled in the art will appreciate that the present invention thus permits the formation of a sub-assembly of wheel hub cover, mounting fasteners, lock washer, and gasket at a hub manufacturing location. The sub-assembly enables installation of a complete wheel cover assembly to a machined mounting surface of a wheel end during production line mounting of the covers to vehicular wheel ends. Moreover, the invention avoids any subsequent disassembly effort prior to the mounting of the hub cover to the wheel assembly. The invention thus reduces required assembly time, hence improves wheel end production line efficiency.

Although only one preferred embodiment has been detailed and described herein, numerous additional embodiments are envisioned to fall within the spirit and scope of the following claims.

What is claimed is:

1. In a hub cover adapted for securement to a vehicular wheel end, said cover formed of a moldable material and including at least one cylindrical aperture defining an axis, and a threaded fastener comprising a shaft with threads having a defined root diameter, said fastener extending through said aperture for securement of said cover to said wheel end; an improvement comprising: said aperture comprising an integral flexible flange at one axial end of said aperture, said flange integrally attached to the cylindrical wall of said aperture, said flange comprising spaced segments extending orthogonally to said axis, said segments defining a lead-in hole for said fastener, said segments defining a plurality of V-shaped spaces between adjoining segments, the thickness of each segment being tapered such that the greatest thickness of each segment is at its integral attachment to the aperture wall, and wherein said lead-in hole comprises an undeflected diameter substantially equal to the root diameter of said shaft; whereby upon insertion of said fastener, said segments are axially deflected to permit axial passage of said fastener through said aperture, whereby said lead-in hole enlarges to enable said threads of said fastener to pass into and through the aperture.

2. The hub cover of claim 1 wherein said cover material is a synthetic plastic.

3. The hub cover of claim 2 further comprising a periphery having a plurality of fillets, said aperture being contained within one of said fillets.

4. The hub cover of claim 3 wherein said cover assembly further comprises a gasket being retained to said hub cover by said fastener.

5. The hub cover of claim 4 wherein said gasket has an aperture aligned with said hub cover aperture, and wherein said gasket aperture is sized for an interference fit with said fastener for retention of said gasket by said fastener.

6. The hub cover of claim 5 comprising a plurality of apertures in said cover, all circumferentially spaced about said periphery of said cover.

7. The hub cover of claim 6 wherein said gasket includes a plurality of apertures, all adapted to align with said apertures of said cover.

* * * * *